(12) United States Patent
Jeong et al.

(10) Patent No.: US 12,523,698 B2
(45) Date of Patent: Jan. 13, 2026

(54) BATTERY MANAGEMENT APPARATUS AND METHOD

(71) Applicant: LG Energy Solution, Ltd., Seoul (KR)

(72) Inventors: Hee-Seok Jeong, Daejeon (KR);
Yoon-Jung Bae, Daejeon (KR);
A-Ming Cha, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 376 days.

(21) Appl. No.: 17/926,309

(22) PCT Filed: Sep. 8, 2021

(86) PCT No.: PCT/KR2021/012246
§ 371 (c)(1),
(2) Date: Nov. 18, 2022

(87) PCT Pub. No.: WO2022/055264
PCT Pub. Date: Mar. 17, 2022

(65) Prior Publication Data
US 2023/0280403 A1    Sep. 7, 2023

(30) Foreign Application Priority Data

Sep. 9, 2020    (KR) .................... 10-2020-0115637

(51) Int. Cl.
*G01R 31/367* (2019.01)
*G01R 31/3835* (2019.01)
(Continued)

(52) U.S. Cl.
CPC ....... *G01R 31/367* (2019.01); *G01R 31/3835* (2019.01); *G01R 31/392* (2019.01);
(Continued)

(58) Field of Classification Search
CPC .............. G01R 31/367; G01R 31/3835; G01R 31/392; H01M 10/42; H01M 10/425;
(Continued)

(56) References Cited

U.S. PATENT DOCUMENTS

| 2011/0012604 A1* | 1/2011 | Tsujiko | ............... H01M 4/5825 |
| | | | 324/427 |
| 2012/0105068 A1* | 5/2012 | Wang | ............... H01M 10/0525 |
| | | | 324/427 |

(Continued)

FOREIGN PATENT DOCUMENTS

| EP | 3696903 A1 | 8/2020 |
| JP | 2012054220 A | 3/2012 |

(Continued)

OTHER PUBLICATIONS

International Search Report for Application No. PCT/KR2021/012246 mailed Dec. 27, 2021, pp. 1-3.

*Primary Examiner* — Kyle R Quigley
(74) *Attorney, Agent, or Firm* — BRYAN CAVE LEIGHTON PAISNER LLP

(57) ABSTRACT

A battery management apparatus and method performs appropriate control to increase the lifespan of a battery cell by judging whether degradation of the battery cell is accelerated. Since both the voltage change pattern and the differential capacity change pattern between the plurality of peaks included in the plurality of differential profiles are considered, there is an advantage that it is possible to accurately determine whether the state of the battery cell is in a degradation accelerated state.

10 Claims, 9 Drawing Sheets

(51) Int. Cl.
*G01R 31/392* (2019.01)
*H01M 10/42* (2006.01)
*H01M 10/44* (2006.01)
*H02J 7/00* (2006.01)

(52) U.S. Cl.
CPC ......... *H01M 10/425* (2013.01); *H01M 10/44* (2013.01); *H02J 7/0047* (2013.01); *H01M 2010/4271* (2013.01)

(58) Field of Classification Search
CPC ................ H01M 10/44; H01M 10/48; H01M 2010/4271; H02J 7/0047; Y02E 60/10
See application file for complete search history.

(56) References Cited

U.S. PATENT DOCUMENTS

| | | | |
|---|---|---|---|
| 2012/0169288 A1 | 7/2012 | Ueki et al. | |
| 2013/0119940 A1 | 5/2013 | Iriyama et al. | |
| 2013/0314050 A1* | 11/2013 | Matsubara | H02J 7/00 320/134 |
| 2013/0335009 A1 | 12/2013 | Katsumata et al. | |
| 2014/0266060 A1* | 9/2014 | Ying | H02J 7/005 320/134 |
| 2015/0200425 A1 | 7/2015 | Iriyama et al. | |
| 2016/0061908 A1* | 3/2016 | Torai | G01R 31/3648 702/63 |
| 2016/0116547 A1* | 4/2016 | Hanyu | G01R 31/367 320/134 |
| 2016/0195589 A1* | 7/2016 | Hanyu | G01R 31/392 702/63 |
| 2016/0254687 A1 | 9/2016 | Tanaka et al. | |
| 2018/0269540 A1* | 9/2018 | Tanaka | H02J 7/0068 |
| 2019/0113577 A1* | 4/2019 | Severson | G01R 31/3842 |
| 2020/0393518 A1* | 12/2020 | Takegami | G01R 31/392 |
| 2021/0046844 A1 | 2/2021 | Bae et al. | |

FOREIGN PATENT DOCUMENTS

| | | |
|---|---|---|
| JP | 5287872 B2 | 9/2013 |
| JP | 5354416 B1 | 11/2013 |
| JP | 5940145 B2 | 6/2016 |
| JP | 2017133870 A | 8/2017 |
| JP | 2019158597 A | 9/2019 |
| JP | 6607167 B2 | 11/2019 |
| KR | 20130142884 A | 12/2013 |
| KR | 20160026766 A | 3/2016 |
| KR | 20190118529 A | 10/2019 |

* cited by examiner

BATTERY MANAGEMENT APPARATUS AND METHOD

CROSS REFERENCE TO RELATED APPLICATIONS

The present application is a national phase entry of 35 U.S.C. § 371 of International Application No. PCT/KR2021/012246 filed Sep. 8, 2021, which claims priority to Korean Patent Application No. 10-2020-0115637 filed on Sep. 9, 2020, in the Republic of Korea, the disclosures of which are incorporated herein by reference.

TECHNICAL FIELD

The present disclosure relates to a battery management apparatus and method, and more particularly, to a battery management apparatus and method for judging whether degradation of a battery cell is accelerated.

BACKGROUND ART

Recently, the demand for portable electronic products such as notebook computers, video cameras and portable telephones has increased sharply, and electric vehicles, energy storage batteries, robots, satellites and the like have been developed in earnest. Accordingly, high-performance batteries allowing repeated charging and discharging are being actively studied.

Batteries commercially available at present include nickel-cadmium batteries, nickel hydrogen batteries, nickel-zinc batteries, lithium batteries and the like. Among them, the lithium batteries are in the limelight since they have almost no memory effect compared to nickel-based batteries and also have very low self-charging rate and high energy density.

In general, since such a battery is degraded as being used, it is necessary to accurately judge the state of the battery in order to accurately estimate the state of charge (SOC) and the state of health (SOH) of the degraded battery or control to increase the lifespan of the degraded battery. In particular, in order to effectively increase the lifespan of a battery, it is required to control corresponding to the degree of degradation (a degradation rate) of the battery.

Conventionally, in order to detect abnormality of a battery, an inspection system for comparing a feature point of a previously stored V-dQ/dV curve with a feature point of a dQ/dV actual value is disclosed (Patent Document 1). However, in the related art, the abnormality of a battery is detected just by judging whether the feature point of the dQ/dV actual value falls within a predetermined voltage (V) range and a predetermined dQ/dV range.

That is, in the prior art, only the abnormality or defect of the battery is judged, and the configuration for judging the degree of degradation of the battery in order to increase the lifespan of the battery is not disclosed at all.
(Patent Document 1) KR 10-2013-0142884 A

SUMMARY

Technical Problem

The present disclosure is designed to solve the problems of the related art, and therefore the present disclosure is directed to providing a battery management apparatus and method that may perform appropriate control to increase the lifespan of a battery cell by judging whether degradation of the battery cell is accelerated.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

A battery management apparatus according to an aspect of the present disclosure may comprise: a controller; and memory having stored thereon instructions that, when executed, are configured to cause the controller to: obtain a plurality of differential profiles for the battery cell at different cycles of the battery cell, each differential profile representing a relationship between voltages and differential capacities corresponding to the voltages during the respective cycle; for each differential profile, select a respective peak included in a preset voltage region of the differential profile; determine each of a voltage change pattern and a differential capacity change pattern of the respective selected peaks; and determine whether degradation of the battery cell is accelerated according to whether the determined voltage change pattern corresponds to a preset first reference pattern and whether the determined differential capacity change pattern corresponds to a preset second reference pattern.

The instructions may be configured to cause the controller to determine the voltage change pattern and the differential capacity change pattern for each respective pair of peaks in consecutively obtained differential profiles.

The first reference pattern may be a rate of voltage increase equal to or greater than a preset threshold voltage.

The instructions may be configured to cause the controller to determine that the voltage change pattern corresponds to the first reference pattern based on the determined voltage change pattern the voltage difference between the respective pair of peaks being equal to or greater than the threshold voltage.

The second reference pattern may be an increase in differential capacity.

The instructions may be configured to cause the controller to determine that the differential capacity change pattern corresponds to the second reference pattern based on the determined differential capacity change increasing.

The instructions may be configured to cause the controller to order the determined voltage change patterns and differential capacity change patterns according to a cycle order of the battery cell, and to determine whether degradation of the battery cell is accelerated based on an analysis of the ordered determined voltage change patterns and differential capacity change patterns.

The instructions may be configured to cause the controller to determine at least one target peak at which the voltage change pattern corresponds to the first reference pattern and the differential capacity change pattern corresponds to the second reference pattern.

The instructions may be configured to cause the controller to determine that degradation of the battery cell is accelerated from an earliest cycle corresponding to the at least one target peak.

The instructions may be configured to cause the controller to set a discharge end voltage for the battery cell to be equal to or greater than a voltage corresponding to the at least one target peak.

The preset voltage region may be a partial region of a voltage region for the battery cell.

A battery pack according to another aspect of the present disclosure may comprise the battery management apparatus according to any aspect of the present disclosure described herein.

A battery management method according to another aspect of the present disclosure may comprise: obtaining, by a controller, a plurality of differential profiles for the battery cell at different cycles of the battery cell, each differential profile representing a relationship between voltages and differential capacities corresponding to the voltages during the respective cycle; for each differential profile, selecting, by the controller, a respective peak included in a preset voltage region of the differential profile; determining, by the controller, each of a voltage change pattern and a differential capacity change pattern of the respective selected peaks; and determining, by the controller, whether degradation of the battery cell is accelerated according to whether the determined voltage change pattern corresponds to a preset first reference pattern and whether the determined differential capacity change pattern corresponds to a preset second reference pattern.

Advantageous Effects

According to one aspect of the present disclosure, since both the voltage change pattern and the differential capacity change pattern between the plurality of peaks included in the plurality of differential profiles are considered, there is an advantage that it is possible to accurately judge whether the state of the battery cell is in a degradation accelerated state.

The effects of the present disclosure are not limited to the effects mentioned above, and other effects not mentioned will be clearly understood by those skilled in the art from the description of the claims.

BRIEF DESCRIPTION OF THE DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

DETAILED DESCRIPTION

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Additionally, in describing the present disclosure, when it is deemed that a detailed description of relevant known elements or functions renders the key subject matter of the present disclosure ambiguous, the detailed description is omitted herein.

The terms including the ordinal number such as "first", "second" and the like, may be used to distinguish one element from another among various elements, but not intended to limit the elements by the terms.

Throughout the specification, when a portion is referred to as "comprising" or "including" any element, it means that the portion may include other elements further, without excluding other elements, unless specifically stated otherwise.

Furthermore, the term "control unit" described in the specification refers to a unit that processes at least one function or operation, and may be implemented by hardware, software, or a combination of hardware and software.

In addition, throughout the specification, when a portion is referred to as being "connected" to another portion, it is not limited to the case that they are "directly connected", but it also includes the case where they are "indirectly connected" with another element being interposed between them.

Hereinafter, preferred embodiments of the present disclosure will be described in detail with reference to the accompanying drawings.

Figure 1:
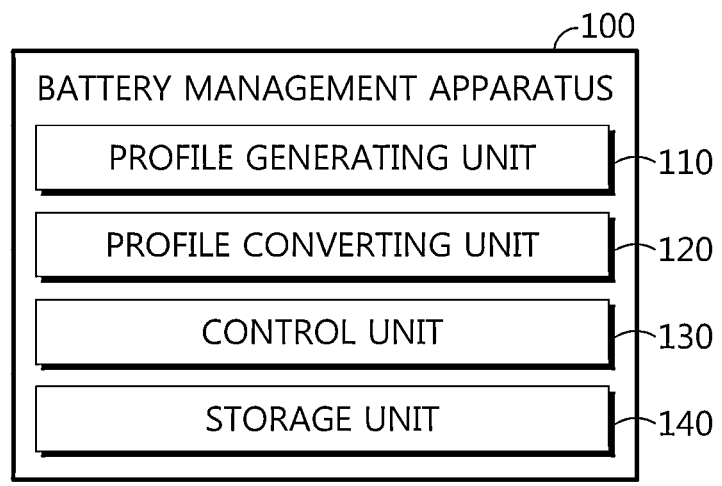
FIG. 1 is a diagram schematically showing a battery management apparatus according to an embodiment of the present disclosure.

FIG. 1 is a diagram schematically showing a battery management apparatus 100 according to an embodiment of the present disclosure.

Referring to FIG. 1, the battery management apparatus 100 according to an embodiment of the present disclosure may include a profile generating unit 110, a profile converting unit 120, and a control unit 130.

The profile generating unit 110 may be configured to obtain battery information including a voltage V and a capacity Q of a battery cell B.

Here, the battery cell B means one independent cell that includes a negative electrode terminal and a positive electrode terminal and is physically separable. For example, one pouch-type lithium polymer cell may be regarded as the battery cell B.

For example, the profile generating unit 110 may be configured to communicate with the outside. In addition, the profile generating unit 110 may receive the battery information from the outside.

The profile generating unit 110 may be configured to generate a battery profile representing a corresponding relationship between the voltage and the capacity based on the obtained battery information.

Specifically, the profile generating unit 110 may generate a battery profile by mapping a voltage and a capacity corresponding to each other in the obtained battery information.

For example, the profile generating unit 110 may generate a battery profile in the form of a table in which a voltage and a capacity corresponding to each other are mapped. As another example, the profile generating unit 110 may generate a battery profile in the form of a flat graph in which a voltage and a capacity corresponding to each other are mapped. That is, the battery profile generated by the profile generating unit 110 may be expressed in various forms as long as it can represent the corresponding relationship between the voltage and the capacity.

The profile converting unit 120 may be configured to receive the battery profile from the profile generating unit 110.

Specifically, the profile converting unit 120 and the profile generating unit 110 may be connected by wire or wirelessly to enable communication with each other. In addition, the profile converting unit 120 may receive the battery profile from the profile generating unit 110 through a wired line or a wireless communication network.

The profile converting unit 120 may be configured to convert the received battery profile into a differential profile representing a corresponding relationship between the voltage and a differential capacity for the voltage.

Here, the differential capacity is a value obtained by differentiating a capacity with a voltage with respect to voltage and capacity corresponding to each other, and may be expressed as "dQ/dV". In addition, the unit of the differential capacity may be [mAh/V]. That is, the profile converting unit 120 may convert the battery profile received from the profile generating unit 110 into a differential profile.

Figure 2:
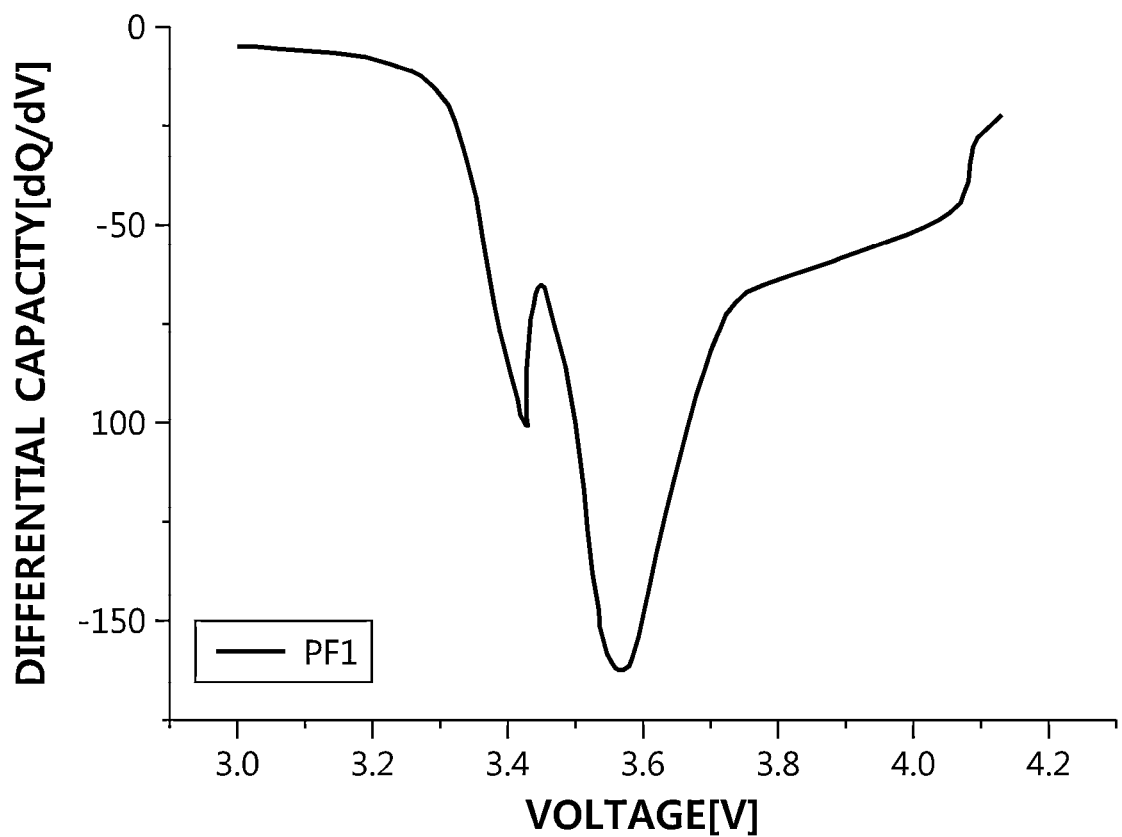
FIG. 2 is a diagram schematically showing a first differential profile according to an embodiment of the present disclosure.

FIG. 2 is a diagram schematically showing a first differential profile PF1 according to an embodiment of the present disclosure.

Specifically, the first differential profile PF1 of FIG. 2 may be a differential profile for a battery cell B in a BOL (Beginning Of Life) state. That is, the profile converting unit 120 may receive the battery profile for the battery cell B in a BOL state from the profile generating unit 110 and convert the received battery profile into the first differential profile PF1.

Hereinafter, for convenience of explanation, it is noted that the X-Y plane graph in which the voltage is set to X axis and the differential capacity is set to Y axis will be described as a differential profile.

The control unit 130 may be configured to obtain a plurality of differential profiles PF1 to PF7 for the battery cell B converted by the profile converting unit 120.

Here, the plurality of differential profiles PF1 to PF7 may be a differential profile converted in each of a plurality of cycles for the battery cell B.

For example, the control unit 130 may be connected to the profile converting unit 120 by wire or wirelessly so as to communicate. In addition, the control unit 130 may receive the plurality of differential profiles PF1 to PF7 from the profile converting unit 120.

Hereinafter, for convenience of explanation, it will be described that the control unit 130 obtains a differential profile at intervals of 300 cycles from the BOL state with respect to the battery cell B that has been used up to 1800 cycles. However, it should be noted that the cycle interval in which the battery profile is generated by the profile generating unit 110 and the battery profile is converted into a differential profile by the profile converting unit 120 is not limited to only 300 cycles. For example, the profile generating unit 110 may generate a battery profile at every 1 cycle, and the profile converting unit 120 may convert all the battery profiles generated at every 1 cycle into differential profiles. In addition, the profile converting unit 120 may immediately transmit the converted differential profile to the control unit 130 when the conversion of the differential profile is completed, or obtain a certain number of differential profiles and then transmit the plurality of obtained differential profiles PF1 to PF7 to the control unit 130.

Figure 3:
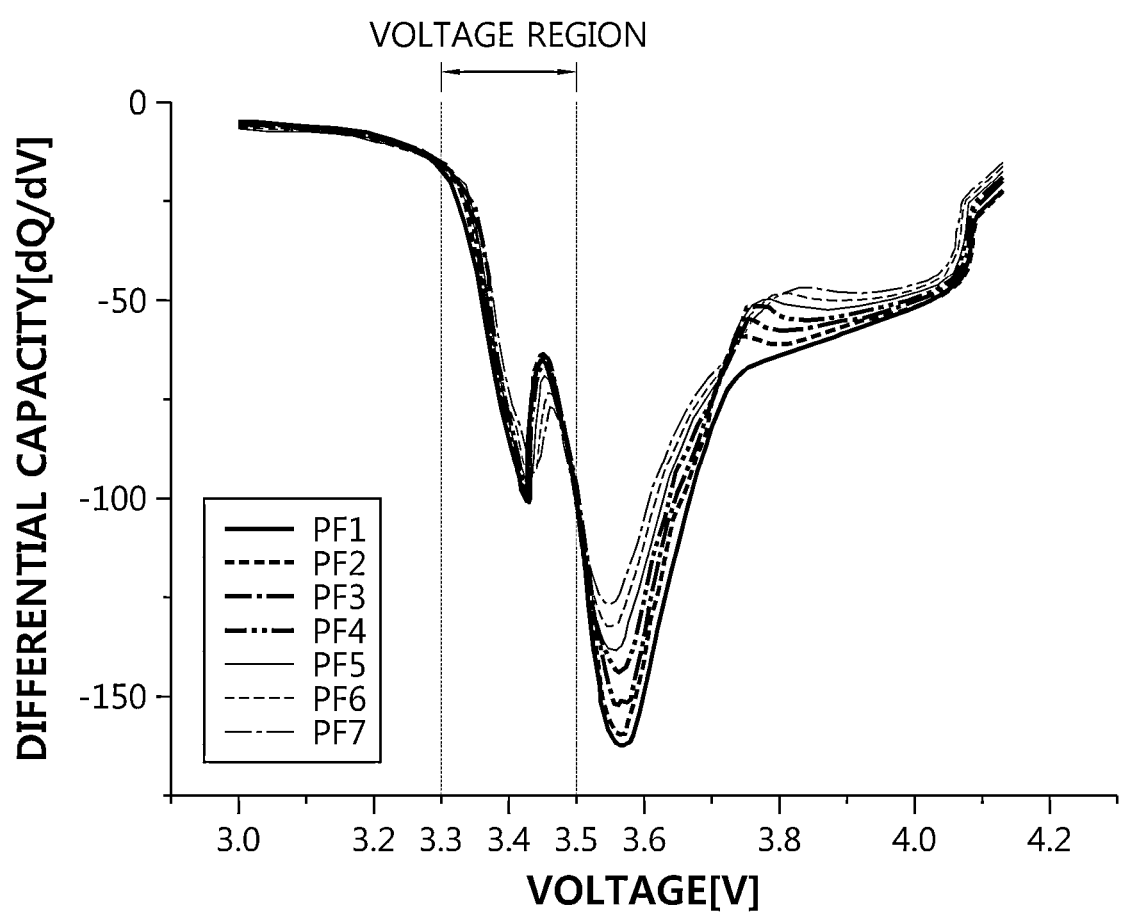
FIG. 3 is a diagram schematically showing first to seventh differential profiles according to an embodiment of the present disclosure.

FIG. 3 is a diagram schematically showing first to seventh differential profiles PF1 to PF7 according to an embodiment of the present disclosure.

For example, in the embodiment of FIG. 3, the first differential profile PF1 may be a differential profile for the battery cell B in a BOL state, and the second differential profile PF2 may be a differential profile for a battery cell B of 300 cycles. In addition, the third differential profile PF3 may be a differential profile for a battery cell B of 600 cycles, and the fourth differential profile PF4 may be a differential profile for a battery cell B of 900 cycles. In addition, the fifth differential profile PF5 is a differential profile for a battery cell B of 1200 cycles, the sixth differential profile PF6 is a differential profile for a battery cell B of 1500 cycles, and the seventh differential profile PF7 is a differential profile for a battery cell B of 1800 cycles.

The control unit 130 may be configured to select a peak included in a preset criterion voltage region from each of the plurality of obtained differential profiles PF1 to PF7.

Specifically, the control unit 130 may select a peak at which the differential capacity is smallest while an instantaneous change rate of the differential capacity with respect to voltage is 0, in the criterion voltage region of each of the plurality of differential profiles PF1 to PF7.

More specifically, the peak may be a point at which the instantaneous change rate of the differential capacity with respect to voltage is 0 and the differential capacity is smallest in the criterion voltage region. In addition, based on the peak, the instantaneous change rate of a low voltage (the instantaneous change rate of the differential capacity with respect to voltage) may be negative, and the instantaneous change rate of a high voltage may be positive. That is, the peak may be a point having a downward convex shape in the X-Y plane graph.

Also, the criterion voltage region may be preset as a partial region near a discharge end in the voltage region for the battery cell B.

Specifically, the criterion voltage region may be set as a voltage region in which the peak of the battery cell B appears. That is, in general, the peak of the battery cell B appears near the discharge end of the battery cell B, and the voltage of the peak of a degraded battery cell B is not significantly different from the voltage of the peak of the battery cell B in the BOL state. Accordingly, the criterion voltage region may be set as a voltage region including the voltage at which the peak of the battery cell B in the BOL state appears. For example, the criterion voltage region may be preset to a voltage region of 3.3 [V] to 3.5[V].

Figure 4:
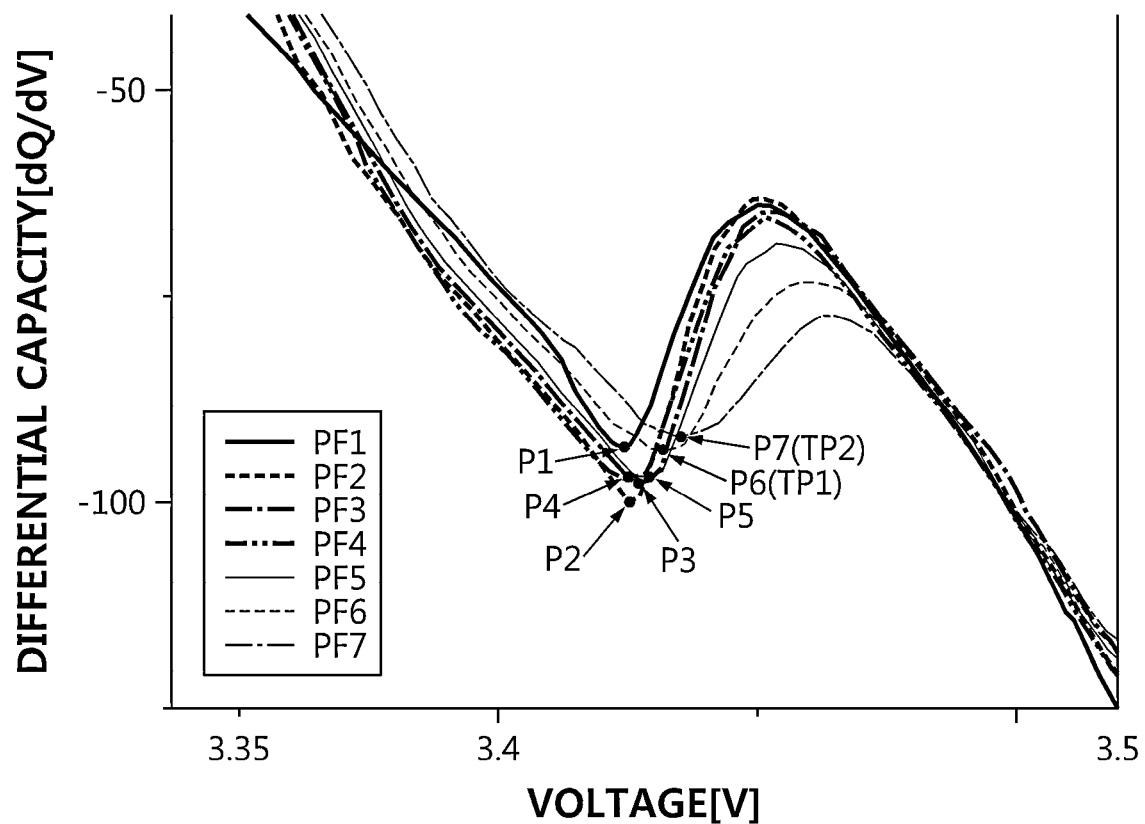
FIG. 4 is an enlarged view showing a portion of the first to seventh differential profiles according to an embodiment of the present disclosure.

FIG. 4 is an enlarged view showing a portion of the first to seventh differential profiles PF1 to PF7 according to an embodiment of the present disclosure.

Specifically, FIG. 4 is an enlarged view showing a partial region of the criterion voltage region in the first to seventh differential profiles PF1 to PF7. More specifically, FIG. 4 is an enlarged view showing a voltage region of 3.35 [V] to 3.5 [V] in the first to seventh differential profiles PF1 to PF7.

For example, in the embodiment of FIG. 4, the control unit 130 may select a first peak P1 from the first differential profile PF1 and select a second peak P2 from the second differential profile PF2. In addition, the control unit 130 may select a third peak P3 from the third differential profile PF3 and select a fourth peak P4 from the fourth differential profile PF4. Finally, the control unit 130 may select a fifth peak P5 from the fifth differential profile PF5, select a sixth peak P6 from the sixth differential profile PF6, and select a seventh peak P7 from the seventh differential profile PF7.

The control unit 130 may be configured to determine a voltage change pattern for the voltage and a differential capacity change pattern for the differential capacity of the plurality of selected peaks P1 to P7.

Specifically, the control unit 130 may be configured to determine the voltage change pattern and the differential capacity change pattern for every two peaks corresponding to each other among the plurality of peaks P1 to P7. Preferably, the control unit 130 may determine the voltage change pattern and the differential capacity change pattern for the plurality of peaks P1 to P7 according to a cycle order for the battery cell B.

For example, the control unit 130 may classify peak pairs into the first peak P1 and the second peak P2, the second peak P2 and the third peak P3, the third peak P3 and the fourth peak P4, the fourth peak P4 and the fifth peak P5, the fifth peak P5 and the sixth peak P6, and the sixth peak P6 and the seventh peak P7, and determine a voltage change pattern and a differential capacity change pattern for each of the classified peak pairs.

Here, the voltage change pattern may mean a pattern in which the voltage of the peak is changed as the cycle of the battery cell B increases. In addition, the differential capacity change pattern may mean a pattern in which the differential capacity of the peak is changed as the cycle of the battery cell B increases.

In the embodiment of FIG. 4, the voltage change pattern of the first to third peak P1, P2, P3 may be an increasing pattern, the voltage change pattern between the third peak P3 and the fourth peak P4 may be a decreasing pattern, and the voltage change pattern of the fourth to seventh peaks P4 to P7 may be an increasing pattern.

In addition, in the embodiment of FIG. 4, the differential capacity change pattern between the first peak P1 and the second peak P2 may be a decreasing pattern, and the differential capacity change pattern of the second to seventh peaks P2 to P7 may be an increasing pattern.

The control unit 130 may be configured to judge whether degradation of the battery cell B is accelerated according to whether the determined voltage change pattern corresponds to a preset first reference pattern and whether the determined differential capacity change pattern corresponds to a preset second reference pattern.

Here, the first reference pattern may be configured as a pattern in which the voltage is increased toward a high voltage to be equal to or greater than a preset criterion voltage. For example, the criterion voltage may be preset to 3 [mV]. That is, the first reference pattern may be a pattern in which the voltage between two peaks corresponding to the cycle order increases toward a high voltage as the cycle for the battery cell B increases, and both voltages are different by 3 [mV] or more.

Specifically, the control unit 130 may be configured to determine whether the voltage change pattern corresponds to the first reference pattern by judging whether the determined voltage change pattern is an increasing pattern and a voltage difference between the corresponding peaks is equal to or greater than the criterion voltage.

For example, in the embodiment of FIG. 4, the voltage change pattern of the first to third peaks P1, P2, P3 and the voltage change pattern of the fourth to seventh peaks P4, P5, P6, P7 are an increasing pattern. However, the voltage difference between the first peak P1 and the second peak P2, the voltage difference between the second peak P2 and the third peak P3, and the voltage difference between the fourth peak P4 and the fifth peak P5 may be less than the criterion voltage. In addition, the voltage difference between the fifth peak P5 and the sixth peak P6 and the voltage difference between the sixth peak P6 and the seventh peak P7 may be greater than or equal to the criterion voltage. Accordingly, the control unit 130 may determine that the voltage change pattern of the fifth to seventh peaks P5, P6, P7 corresponds to the first reference pattern.

That is, an error may be included in the voltage and capacity measured for the battery cell B due to various causes inside and/or outside the battery cell B. In addition, the error may also be reflected in the voltage of the peak included in the differential profile based on the battery information. Therefore, the control unit 130 may determine whether the voltage change pattern of the plurality of peaks P1 to P7 corresponds to the first reference pattern by primarily considering whether the voltage change pattern is an increasing pattern and secondarily considering whether the voltage difference between the corresponding peaks is equal to or greater than the criterion voltage.

In addition, the second reference pattern may be configured as a pattern in which the determined differential capacity increases.

Specifically, the control unit 130 may be configured to determine whether the differential capacity change pattern corresponds to the second reference pattern by judging whether the differential capacity change pattern is an increasing pattern.

For example, in the embodiment of FIG. 4, the differential capacity change pattern of the second to seventh peaks P2 to P7 is an increasing pattern. Accordingly, the control unit 130 may determine that the differential capacity change pattern of the second to seventh peaks P2 to P7 corresponds to the second reference pattern.

In addition, through this process, if the voltage change pattern corresponds to the first reference pattern and the differential capacity change pattern corresponds to the second reference pattern, the control unit 130 may judge that the state of the battery cell B is a degradation acceleration state.

Here, the degradation acceleration state means a state in which the degradation of the battery cell B is accelerated.

In general, the battery cell B is degraded as the cycle progresses. As the battery cell B is used for a long time, the degradation rate of the battery cell B may gradually increase. For example, even for the same period, the degree of degradation of the battery cell B from a first time point in the BOL state to a second time point and the degree of degradation of the battery cell B from an $N^{th}$ time point in the MOL (Middle of life) state to an $N+1^{th}$ time point may be different from each other. If the degradation of the battery cell B is accelerated as above, it is required to appropriately control the battery cell B in order to slow down the degradation of the battery cell B, so it is important to accurately judge whether the state of the battery cell B is a degradation acceleration state.

Therefore, the battery management apparatus 100 according to an embodiment of the present disclosure has an advantage of accurately judging whether the state of the battery cell B is a degradation acceleration state by considering both the voltage change pattern and the differential capacity change pattern of the plurality of peaks P1 to P7 included in the plurality of differential profiles PF1 to PF7.

Meanwhile, the control unit 130 provided to the battery management apparatus 100 according to an embodiment of the present disclosure may selectively include processors known in the art, application-specific integrated circuit (ASIC), other chipsets, logic circuits, registers, communication modems, data processing devices, and the like to execute various control logic performed in the present disclosure. Also, when the control logic is implemented in software, the control unit 130 may be implemented as a set of program modules. At this time, the program module may be stored in a memory and executed by the control unit 130. The memory may be located inside or out of the control unit 130 and may be connected to the control unit 130 by various well-known means.

In addition, the battery management apparatus 100 according to an embodiment of the present disclosure may further include a storage unit 140. The storage unit 140 may store programs and data required for the battery management apparatus 100 to determine degradation acceleration of the battery cell B. That is, the storage unit 140 may store data necessary for operation and function of each component of the battery management apparatus 100, data generated in the process of performing the operation or function, or the like. The storage unit 140 is not particularly limited in its kind as long as it is a known information storage means that can record, erase, update and read data. As an example, the information storage means may include random access memory (RAM), flash memory, read-only memory (ROM), electrically erasable programmable read-only memory (EEPROM), registers, and the like. In addition, the storage unit 140 may store program codes in which processes executable by the profile generating unit 110, the profile converting unit 120, and the control unit 130 are defined.

For example, the storage unit 140 may store the differential profile converted by the profile converting unit 120. If a plurality of differential profiles are stored in the storage unit 140, the control unit 130 may access the storage unit 140 to obtain the plurality of differential profiles PF1 to PF7. That is, the control unit 130 may obtain the plurality of differential profiles PF1 to PF7 directly from the profile converting unit 120 or may obtain the plurality of differential profiles PF1 to PF7 stored in the storage unit 140 by accessing the storage unit 140.

The control unit 130 may be configured to determine at least one target peak TP1, TP2 at which the voltage change pattern corresponds to the first reference pattern and the differential capacity change pattern corresponds to the second reference pattern, among the plurality of peaks P1 to P7.

For example, in the embodiment of FIG. 4, the voltage change pattern of the fifth to seventh peaks P5 to P7 may correspond to the first reference pattern, and the differential capacity change pattern of the third to seventh peaks P3 to P7 may correspond to the second reference pattern. Accordingly, the control unit 130 may determine the sixth peak P6 and the seventh peak P7 as the target peaks. That is, the control unit 130 may determine the sixth peak P6 as the first target peak TP1 and determine the seventh peak P7 as the second target peak TP2.

In addition, the control unit 130 may be configured to judge that the degradation of the battery cell B is accelerated from a lowest cycle among the cycles corresponding to the at least one target peak.

For example, in the embodiment of FIG. 4, the control unit 130 may judge that the degradation of the battery cell B is accelerated from 1500 cycles corresponding to the first target peak TP1. That is, the control unit 130 may judge that the battery cell B is degraded even before 1200 cycles corresponding to the fifth peak P5, but the state of the battery cell B is not the degradation accelerated state before 1200 cycles.

That is, the battery management apparatus 100 has an advantage of not only judging whether the state of the battery cell B is a degradation acceleration state, but also judging a cycle at which the degradation of the battery cell B is accelerated. Therefore, the battery management apparatus 100 may slow down the degradation of the battery cell B by controlling the battery cell B in consideration of the cycle at which the degradation is accelerated as well as the state of the battery cell B. As a result, since the degradation of the battery cell B progresses slowly, the useful life of the battery cell B may be increased.

In the above, based on the embodiment of FIGS. 3 and 4, it has been described that the state of the battery cell B and the timing of degradation acceleration are judged according to the differential profile of the battery cell B obtained at every 300 cycles. However, the battery management apparatus 100 may set a shorter cycle interval for obtaining a differential profile in order to more accurately judge the state of the battery cell B and the timing of degradation acceleration. For example, if the battery management apparatus 100 judges the state of the battery cell B and the timing of degradation acceleration according to the differential profile of the battery cell B obtained at every 1 cycle, the state of the battery cell B and the timing of degradation acceleration may be judged more accurately.

Hereinafter, various embodiments in which the battery management apparatus 100 may judge the state of the battery cell B as a degradation acceleration state based on the voltage change pattern and the differential capacity change pattern will be described.

Figure 5:
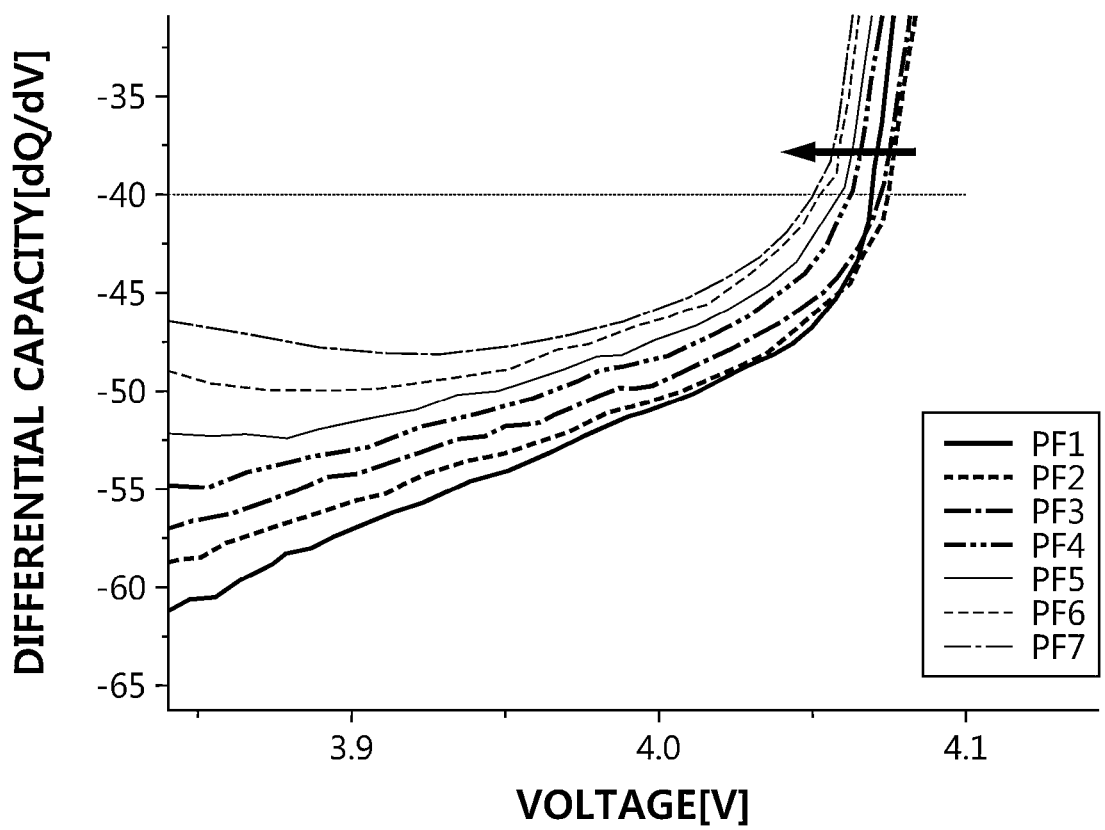
FIG. 5 is an enlarged view showing another portion of the first to seventh differential profiles according to an embodiment of the present disclosure.
Figure 6:
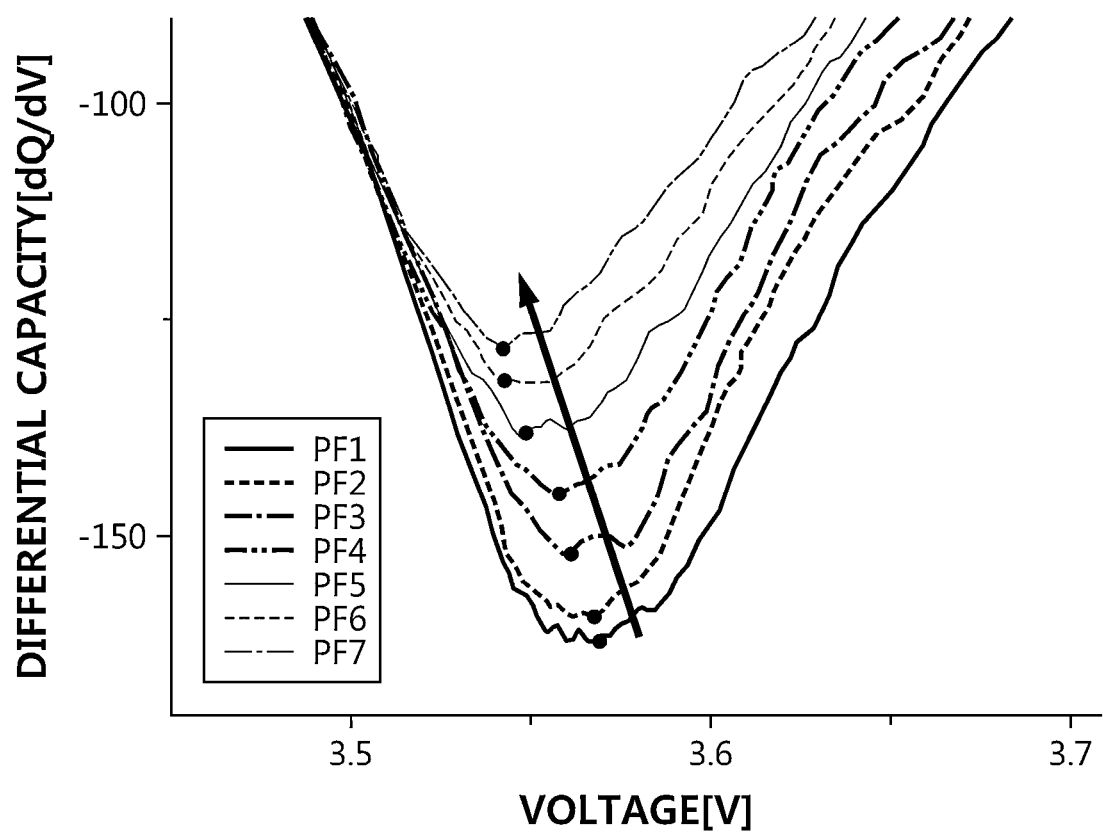
FIG. 6 is an enlarged view showing still another portion of the first to seventh differential profiles according to an embodiment of the present disclosure.

FIG. 5 is an enlarged view showing another portion of the first to seventh differential profiles PF1 to PF7 according to an embodiment of the present disclosure. FIG. 6 is an enlarged view showing still another portion of the first to seventh differential profiles PF1 to PF7 according to an embodiment of the present disclosure.

Specifically, FIG. 5 is an enlarged view showing a voltage region of about 3.85 [V] to 4.1 [V] in the first to seventh differential profiles PF1 to PF7 of FIG. 3. In addition, FIG. 6 is an enlarged view showing a voltage region of about 3.5 [V] to about 3.7 [V] in the first to seventh differential profiles PF1 to PF7 of FIG. 3.

Referring to FIG. 5, it can be seen that after 300 cycles, as the cycle of the battery cell B progresses, the voltage for the same differential capacity is gradually decreased. In addition, referring to FIG. 6, it can be seen that, as the cycle of the battery cell B progresses, the differential capacity of a plurality of peaks included in the voltage region of 3.5 [V] to 3.6 [V] of the first to seventh differential profiles PF1 to PF7 is increased, and the voltage of the plurality of peaks is shifted toward a low voltage. In FIG. 6, the plurality of peaks mean points marked with "•" in each of the first to seventh differential profiles PF1 to PF7.

That is, referring to FIGS. 3, 5 and 6, as the cycle of the battery cell B progresses, the usable capacity of the battery cell B is gradually decreasing, so it can be seen that the battery cell B is degraded as the cycle progresses. For example, in the embodiment of FIG. 3, when the differential profile is integrated based on the differential capacity 0 [mAh/V], the integrated area may be the usable capacity of the battery cell B. Therefore, according to FIGS. 3, 5 and 6, the battery cell B is in a state of being degraded as the cycle progresses.

Figure 7:
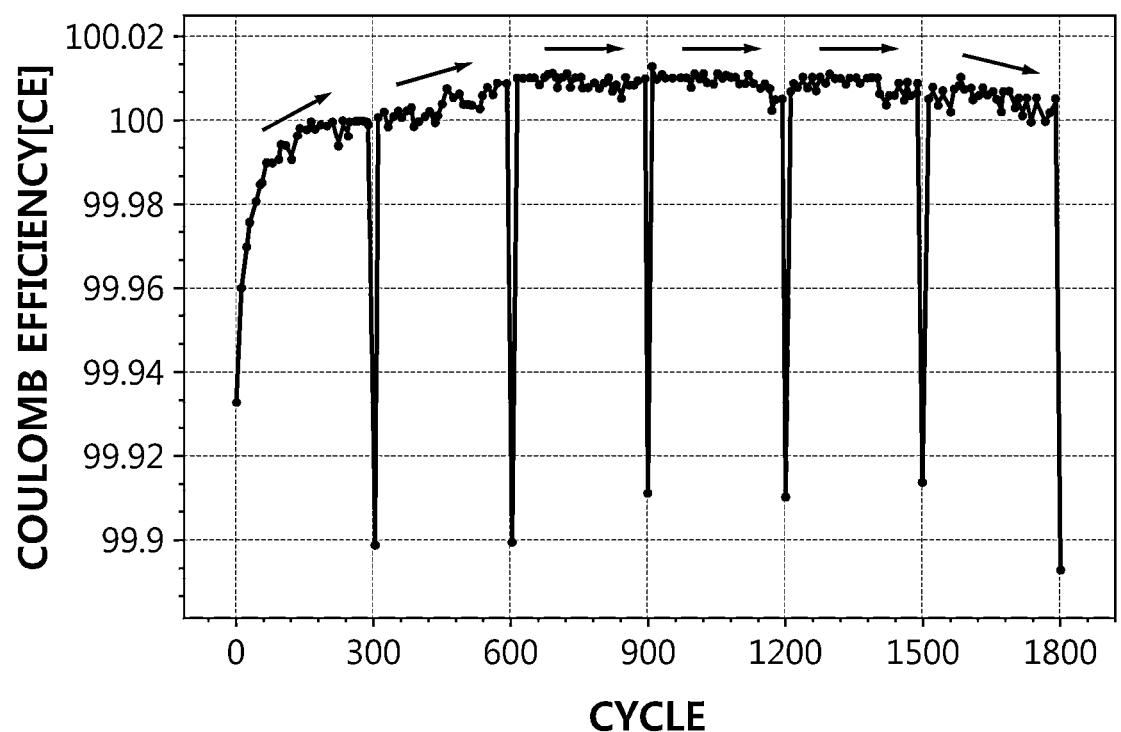
FIG. 7 is a diagram schematically showing Coulomb efficiency of a battery cell per cycle at which degradation acceleration is judged by the battery management apparatus according to an embodiment of the present disclosure.

FIG. 7 is a diagram schematically showing Coulomb efficiency of the battery cell B per cycle at which degradation acceleration is judged by the battery management apparatus 100 according to an embodiment of the present disclosure.

Here, Coulomb efficiency (CE) is calculated for each cycle based on a charge amount calculated according to Coulomb counting while the battery cell B is being charged and a discharge amount calculated according to Coulomb counting while battery cell B is being discharged. Specifically, the Coulomb efficiency may be calculated according to the formula of "discharge amount charge amount×100" for each cycle.

Referring to FIG. 7, the Coulomb efficiency of BOL (0 cycle) to 600 cycles shows an increasing pattern, and the Coulomb efficiency of 600 cycles to 1500 cycles shows a maintained pattern. However, the Coulomb efficiency of 1500 cycles to 1800 cycles shows a decreasing pattern. That is, since the degradation of the battery cell B is accelerated from 1500 cycles, the Coulomb efficiency of 1500 cycles to 1800 cycles shows a decreasing pattern.

Therefore, referring to FIG. 7, the battery management apparatus 100 according to an embodiment of the present disclosure has an advantage of accurately judging whether the state of the battery cell B is a degradation acceleration state based on the voltage change pattern and the differential capacity change pattern of the peak included in the plurality of differential profiles PF1 to PF7, without calculating the Coulomb efficiency for each cycle for the battery cell B. Furthermore, the battery management apparatus 100 has an advantage of judging the cycle point at which the degradation of the battery cell B is accelerated.

Figure 8:
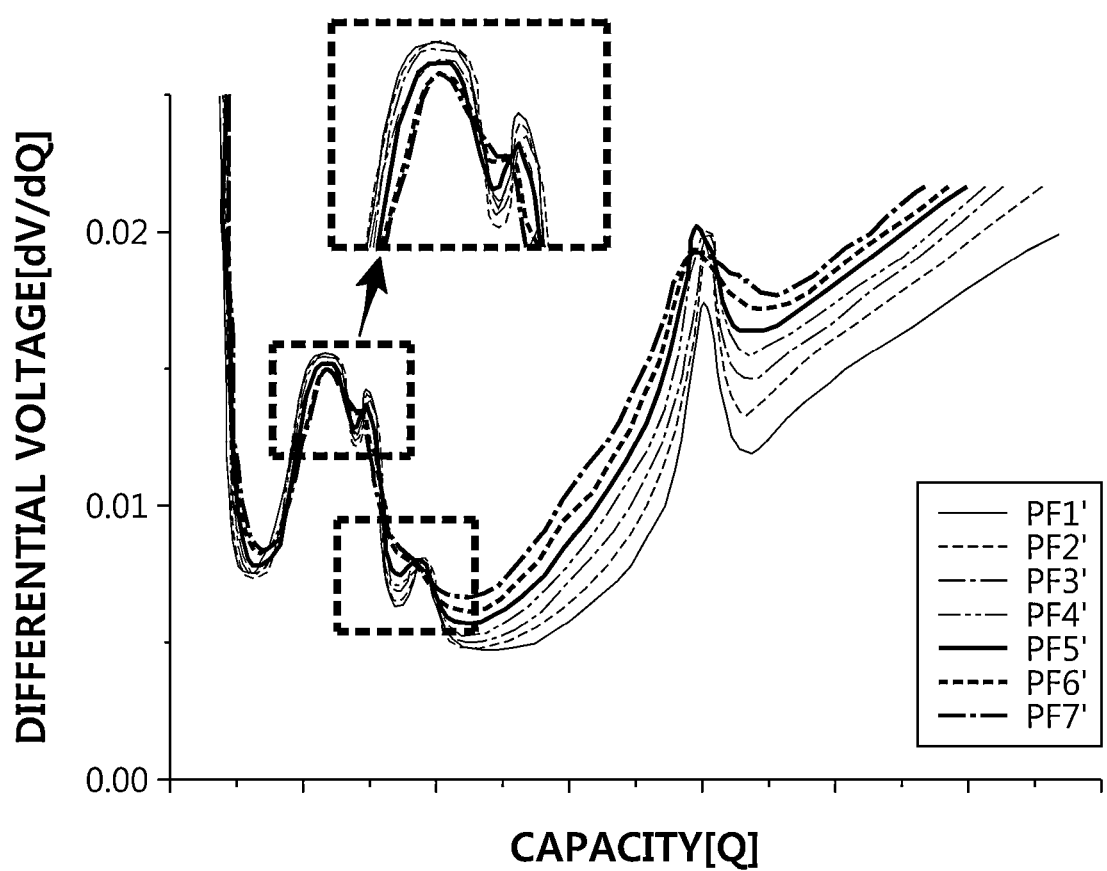
FIG. 8 is a diagram schematically showing a plurality of differential voltage profiles that represent a corresponding relationship between a capacity and a differential voltage of the battery cell.

FIG. 8 is a diagram schematically showing a plurality of differential voltage profiles PF1' to PF7' that represent a corresponding relationship between a capacity and a differential voltage of the battery cell B.

Here, the differential voltage is a value obtained by differentiating voltage by capacity with respect to voltage and capacity corresponding to each other, and may be expressed as "dV/dQ". In addition, the unit of the differential voltage may be [V/mAh]. That is, since the differential voltage profile is a profile representing a corresponding relationship between the differential voltage and the capacity of the battery cell B, it should be noted that the differential voltage profile is a profile different from the differential profile of FIG. 3.

Specifically, FIG. 8 is a diagram showing first to seventh differential voltage profiles PF1' to PF7'. In FIG. 8, the first differential voltage profile PF1' may be a differential voltage profile for the battery cell B in a BOL state, and the second differential voltage profile PF2' may be a differential voltage profile for the battery cell B of 300 cycles. In addition, the third differential voltage profile PF3' may be a differential voltage profile for the battery cell B of 600 cycles, and the fourth differential voltage profile PF4' may be a differential voltage profile for the battery cell B of 900 cycles. In addition, the fifth differential voltage profile PF5' may be a differential voltage profile for the battery cell B of 1200 cycles, the sixth differential voltage profile PF6' may be a differential voltage profile for the battery cell B of 1500 cycles, and the seventh differential voltage profile PF7' may be a differential voltage profile for the battery cell B of 1800 cycles.

For example, in FIG. 8, it can be seen that, as the cycle of the battery cell B increases, the curvature becomes smaller in the order of the first to seventh differential voltage profiles PF1' to PF7', thereby making the curvature gentle.

In addition, if the curvature difference between two differential voltage profiles is compared in the order of the cycle, it can be seen that the curvature difference between the fifth differential voltage profile PF5' and the sixth differential voltage profile PF6' is largest.

Specifically, referring to a box portion indicated by a dotted line in FIG. 8, the curvature between the fifth differential voltage profile PF5' and the sixth differential voltage profile PF6' may be largest. That is, it can be seen that the curvature difference between the fifth and sixth differential voltage profiles PF5', PF6' is largest among the curvature difference between the first and second differential voltage profiles PF1', PF2', the curvature difference between the second and third differential voltage profiles PF2', PF3', the curvature difference between the third and fourth differential voltage profiles PF3', PF4', the curvature difference between the fourth and fifth differential voltage profiles PF4', PF5', the curvature difference between the fifth and sixth differential voltage profiles PF5', PF6', and the curvature difference between the sixth and seventh differential voltage profiles PF6', PF7'.

Specifically, as shown in FIG. 8, the fact that the curvature of the differential voltage profile becomes gentle as the cycle progresses can be explained as the internal resistance of the battery cell B increases due to the degradation of the battery cell B. That is, if the internal resistance of the battery cell B is greatly increased from 1500 cycles, it can be said that the degradation of the battery cell B is accelerated from 1500 cycles.

Therefore, even referring to FIG. 8, the battery management apparatus 100 according to an embodiment of the present disclosure has an advantage of accurately judging whether the state of the battery cell B is a degradation acceleration state. Furthermore, the battery management apparatus 100 has an advantage of judging the cycle point when the degradation of the battery cell B is accelerated.

The control unit 130 may be configured to set a discharge end voltage of the battery cell B to be greater than or equal to a voltage corresponding to the at least one target peak TP1, TP2.

Specifically, if the state of the battery cell B is the degradation acceleration state, the control unit 130 may decrease the usable voltage range of the battery cell B by upwardly controlling the discharge end voltage of the battery cell B. This is because, even when the battery cell B is degraded, if the battery cell B is discharged to a low voltage region, the degradation of the battery cell B can be continuously accelerated. Thus, the control unit 130 may slow down the degradation rate of the battery cell B by increasing the discharge end voltage of the battery cell B.

For example, in the embodiment of FIG. 4, the control unit 130 may determine the sixth peak P6 as the first target peak TP1 and determine the seventh peak P7 as the second target peak TP2. In addition, the control unit 130 may set the discharge end voltage of the battery cell B to be greater than or equal to a voltage corresponding to the first target peak TP1 or a voltage corresponding to the second target peak TP2.

Preferably, the control unit 130 may be configured to set the discharge end voltage for the battery cell B to be greater than or equal to the largest voltage among voltages corresponding to the at least one target peak TP1, TP2.

For example, in the embodiment of FIG. 4, the control unit 130 may set the discharge end voltage of the battery cell B to be greater than or equal to the voltage corresponding to the second target peak TP2. More preferably, the control unit 130 may set the discharge end voltage of the battery cell B to a value greater than the voltage corresponding to the second target peak TP2.

Therefore, the battery management apparatus 100 according to an embodiment of the present disclosure has an advantage of not only judging the state of the battery cell B, but also increasing the lifespan of the battery cell B by upwardly controlling the discharge end voltage of the battery cell B.

The battery management apparatus 100 according to the present disclosure may be applied to a BMS (Battery Management System). That is, the BMS according to the present disclosure may include the battery management apparatus 100 described above. In this configuration, at least some of components of the battery management apparatus 100 may be implemented by supplementing or adding functions of components included in a conventional BMS. For example, the profile generating unit 110, the profile converting unit 120, the control unit 130, and the storage unit 140 of the battery management apparatus 100 may be implemented as components of the BMS.

In addition, the battery management apparatus 100 according to the present disclosure may be provided to a battery pack 1. That is, the battery pack 1 according to the present disclosure may include the battery management apparatus 100 described above and at least one battery cell B. In addition, the battery pack 1 may further include electrical equipment (relays, fuses, etc.) and a case.

Figure 9:
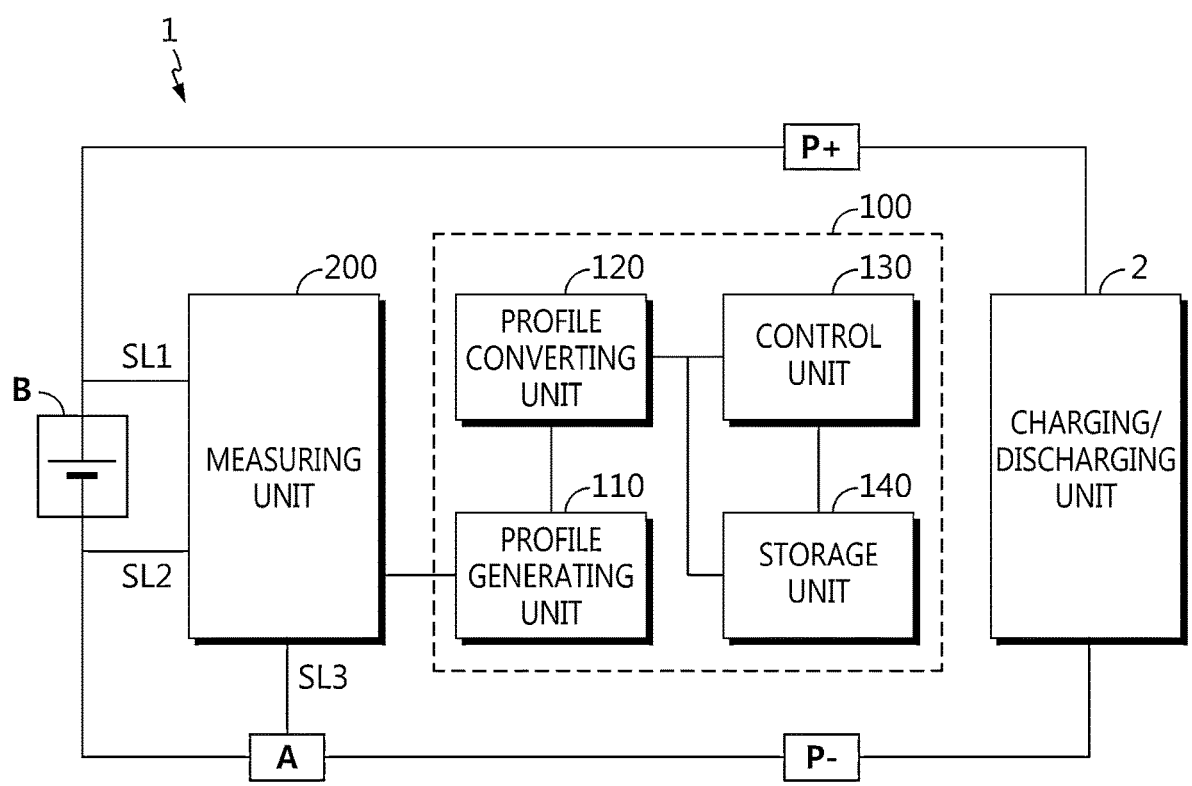
FIG. 9 is a diagram schematically showing an exemplary configuration of a battery pack including the battery management apparatus according to an embodiment of the present disclosure.

FIG. 9 is a diagram schematically showing an exemplary configuration of a battery pack 1 including the battery management apparatus 100 according to an embodiment of the present disclosure.

Referring to FIG. 9, the battery pack 1 includes a positive electrode terminal and a negative electrode terminal, and may include a battery cell B, a measuring unit 200, and a battery management apparatus 100.

The measuring unit 200 may be configured to measure the voltage and capacity of the battery cell B.

Specifically, the measuring unit 200 may measure a voltage of the battery by measuring voltages at both ends of the battery cell B, respectively. Also, the measuring unit 200 may measure a current output from the battery cell B and a discharge time while the battery cell B is being discharged. In addition, the measuring unit 200 may measure a capacity of the battery cell B based on the measured current of the battery cell B and the discharge time.

For example, in the embodiment of FIG. 9, the measuring unit 200 may be connected to a first sensing line SL1, a second sensing line SL2, and a third sensing line SL3. The measuring unit 200 may measure the voltage of the battery cell B through the first sensing line SL1 and the second sensing line SL2. In addition, the measuring unit 200 may be connected to a current measuring unit A through the third sensing line SL3, and may measure the current of the battery cell B through the current measuring unit A. Preferably, the measuring unit 200 may include a timer capable of measuring the discharge time while measuring the current of the battery cell B.

In addition, a charging/discharging unit 2 may be connected to a positive electrode terminal (P+) and a negative electrode terminal (P−) of the battery pack 1 to charge or discharge the battery cell B.

For example, when the battery cell B is discharged by the charging/discharging unit 2, the measuring unit 200 may measure the voltage and capacity of the battery cell B, and transmit battery information including the measured voltage and capacity to the profile generating unit 110. That is, the profile generating unit 110 may obtain battery information by receiving the battery information from the measuring unit 200.

Figure 10:
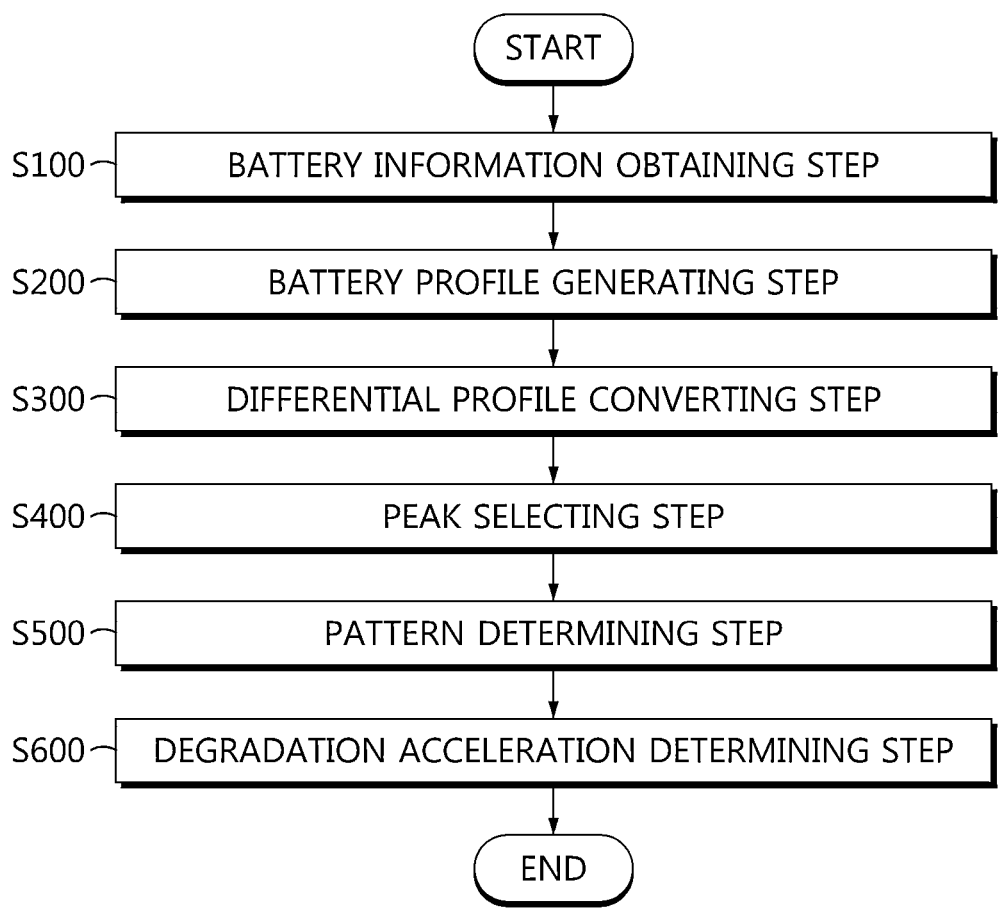
FIG. 10 is a diagram schematically showing a battery management method according to another embodiment of the present disclosure.

FIG. 10 is a diagram schematically showing a battery management method according to another embodiment of the present disclosure. Each step of the battery management method may be performed by the battery management apparatus 100.

Hereinafter, it should be noted that, for convenience of description, content overlapping with the previously described content will be briefly described or omitted.

Referring to FIG. 10, the battery management method may include a battery information obtaining step (S100), a battery profile generating step (S200), a differential profile converting step (S300), a peak selecting step (S400), a pattern determining step (S500), and a degradation acceleration determining step (S600).

The battery information obtaining step (S100) is a step of obtaining battery information including voltage and capacity of a battery cell B, and may be performed by the profile generating unit 110.

For example, the profile generating unit 110 may receive battery information from the outside, or battery information may be directly input to the profile generating unit 110 by a user. Preferably, referring to the embodiment of FIG. 9, the profile generating unit 110 may obtain battery information from the measuring unit 200 capable of measuring the voltage and capacity of the battery cell B.

The profile generating step (S200) is a step of generating a battery profile representing a corresponding relationship between the voltage and the capacity based on the obtained battery information, and may be performed by the profile generating unit 110.

Specifically, the profile generating unit 110 may read voltage and capacity corresponding to each other from the obtained battery information, and generate a battery profile representing a corresponding relationship between the read voltage and capacity.

The differential profile converting step (S300) is a step of converting the battery profile into a differential profile representing a corresponding relationship between the voltage and a differential capacity for the voltage, and may be performed by the profile converting unit 120.

Specifically, the profile converting unit 120 may receive the battery profile from the profile generating unit 110. In addition, the profile converting unit 120 may convert the battery profile into a differential profile representing a corresponding relationship between the voltage and the differential capacity.

The peak selecting step (S400) is a step of selecting a peak included in a preset criterion voltage region in each of the plurality of differential profiles PF1 to PF7 converted in the differential profile converting step (S300), and may be performed by the control unit 130.

For example, in the embodiment of FIG. 4, the control unit 130 may select first to seventh peaks P1 to P7 in the criterion voltage regions of the first to seventh differential profiles PF1 to PF7, respectively.

The pattern determining step (S500) is a step of determining a voltage change pattern for the voltage and a differential capacity change pattern for the differential capacity of the plurality of selected peaks P1 to P7, and may be performed by the control unit 130.

Preferably, the control unit 130 may determine a voltage change pattern and a differential capacity change pattern for the plurality of peaks P1 to P7 according to a cycle order for the battery cell B.

For example, in the embodiment of FIG. 4, the voltage change pattern of the first to third peaks P1 to P3 may be an increasing pattern, the voltage change pattern between the third peak P3 and the fourth peak P4 may be a decreasing pattern, and the voltage change pattern of the fourth to seventh peaks P4 to P7 may be an increasing pattern. In addition, the differential capacity change pattern between the first peak P1 and the second peak P2 may be a decreasing pattern, and the differential capacity change pattern of the second to seventh peaks P2 to P7 may be an increasing pattern.

The degradation acceleration determining step (S600) is a step of judging whether degradation of the battery cell B is accelerated according to whether the determined voltage change pattern corresponds to a preset first reference pattern and whether the determined differential capacity change pattern corresponds to a preset second reference pattern, and may be performed by the control unit 130.

If the voltage change pattern corresponds to the first reference pattern and the differential capacity change pattern corresponds to the second reference pattern, the control unit 130 may judge that the state of the battery cell B is a degradation acceleration state.

Also, the control unit 130 may be configured to determine at least one target peak TP1, TP2 corresponding to the first reference pattern and the second reference pattern among the plurality of peaks P1 to P7. In addition, the control unit 130 may be configured to judge that degradation of the battery cell B is accelerated from a lowest cycle among cycles corresponding to the at least one target peak TP1, TP2.

That is, the control unit 130 may not only judge whether the state of the battery cell B is a degradation acceleration state, but also judge the cycle at which the degradation of the battery cell B is accelerated.

In addition, the control unit 130 may increase the lifespan of the battery cell B by setting the discharge end voltage for the battery cell B to be greater than or equal to the largest voltage among voltages corresponding to the at least one target peak TP1, TP2.

The embodiments of the present disclosure described above may not be implemented only through an apparatus and a method, but may be implemented through a program that realizes a function corresponding to the configuration of the embodiments of the present disclosure or a recording medium on which the program is recorded. The program or recording medium may be easily implemented by those skilled in the art from the above description of the embodiments.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Additionally, many substitutions, modifications and changes may be made to the present disclosure described hereinabove by those skilled in the art without departing from the technical aspects of the present disclosure, and the present disclosure is not limited to the above-described embodiments and the accompanying drawings, and each embodiment may be selectively combined in part or in whole to allow various modifications.

REFERENCE SIGNS

1: battery pack
2: charging/discharging unit
100: battery management apparatus
110: profile generating unit
120: profile converting unit
130: control unit
140: storage unit
200: measuring unit
B: battery cell

What is claimed is:

1. A battery management apparatus, comprising:
a controller; and
memory having stored thereon instructions that, when executed, are configured to cause the controller to:
obtain a plurality of differential profiles for the battery cell at different cycles of the battery cell, each differential profile representing a relationship between voltages and differential capacities corresponding to the voltages during the respective cycle,
for each differential profile, select a respective peak included in a preset voltage region of the differential profile,
determine each of a first shift in voltage and a second shift in differential capacity of the respective selected peaks;
determine whether degradation of the battery cell is accelerated according to whether the determined first shift in the voltage corresponds to a preset first reference pattern and whether the determined second shift in the differential capacity corresponds to a preset second reference pattern; and
set a discharge end voltage for the battery cell to be equal to or greater than a voltage corresponding to at least one target peak determined based on the first shift in voltage and/or the second shift in differential capacity.

2. The battery management apparatus according to claim 1,
wherein the instructions are configured to cause the controller to determine the first shift in voltage and the second shift in differential capacity for each respective pair of peaks in consecutively obtained differential profiles.

3. The battery management apparatus according to claim 2,
wherein the preset first reference pattern corresponds to a voltage increase equal to or greater than a preset threshold voltage, and
wherein the instructions are configured to cause the controller to determine that the first shift in voltage corresponds to the preset first reference pattern based on the determined first shift in voltage, when a voltage difference between the respective pair of peaks is equal to or greater than the preset threshold voltage.

4. The battery management apparatus according to claim 2,
wherein the preset second reference pattern is an increase in differential capacity, and
wherein the instructions are configured to cause the controller to determine that the second shift in differential capacity corresponds to the preset second reference pattern based on the determined differential capacity change increasing.

5. The battery management apparatus according to claim 1,
wherein the instructions are configured to cause the controller to order the determined first shift in voltage and second shift in differential capacity according to a cycle order of the battery cell, and to determine whether degradation of the battery cell is accelerated based on an analysis of the ordered determined first shift in voltage and second shift in differential capacity.

6. The battery management apparatus according to claim 5,
wherein the instructions are configured to cause the controller to determine the at least one target peak at which the first shift in voltage corresponds to the preset first reference pattern and the second shift in differential capacity corresponds to the preset second reference pattern.

7. The battery management apparatus according to claim 6,
wherein the instructions are configured to cause the controller to determine that degradation of the battery cell is accelerated from an earliest cycle corresponding to the at least one target peak.

8. The battery management apparatus according to claim 1,
wherein the preset voltage region is a partial region of a voltage region for the battery cell.

9. A battery pack, comprising the battery management apparatus according to claim 1.

10. A battery management method, comprising:
obtaining, by a controller, a plurality of differential profiles for the battery cell at different cycles of the battery cell, each differential profile representing a relationship between voltages and differential capacities corresponding to the voltages during the respective cycle
for each differential profile, selecting, by the controller, a respective peak included in a preset voltage region of the differential profile;
determining, by the controller, each of a first shift in voltage and a second shift in differential capacity of the respective selected peaks;
determining, by the controller, whether degradation of the battery cell is accelerated according to whether the determined first shift in voltage corresponds to a preset first reference pattern and whether the determined second shift in differential capacity corresponds to a preset second reference pattern; and
setting, by the controller, a discharge end voltage for the battery cell to be equal to or greater than a voltage corresponding to at least one target peak determined based on the first shift in voltage and/or the second shift in differential capacity.

* * * * *